March 15, 1932.  L. B. WINTON  1,849,261
MEANS FOR OPENING CONTAINERS
Filed April 2, 1930
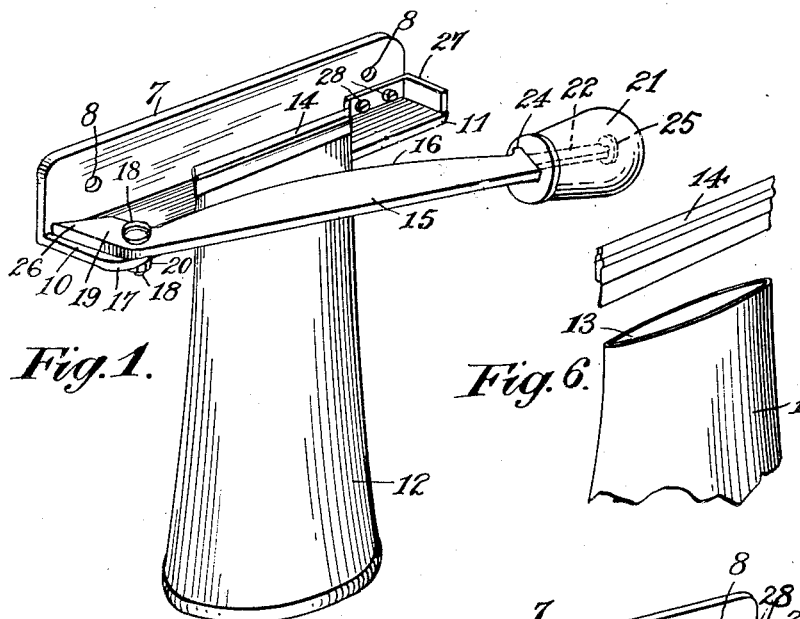
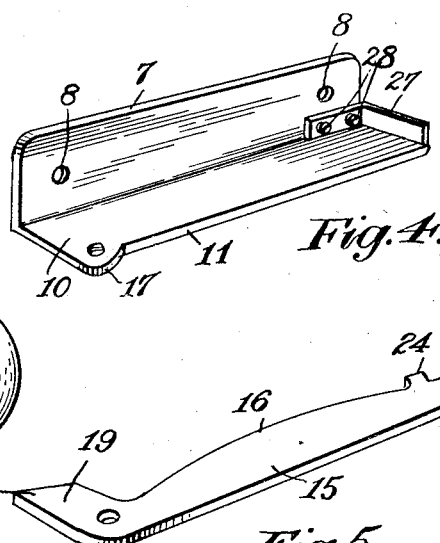
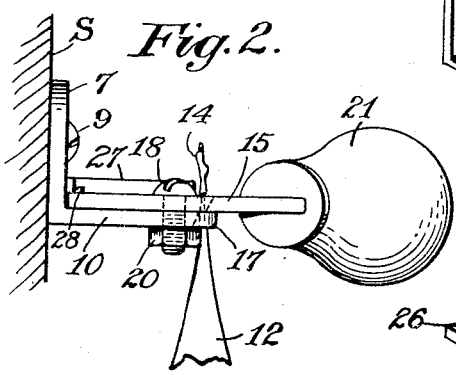
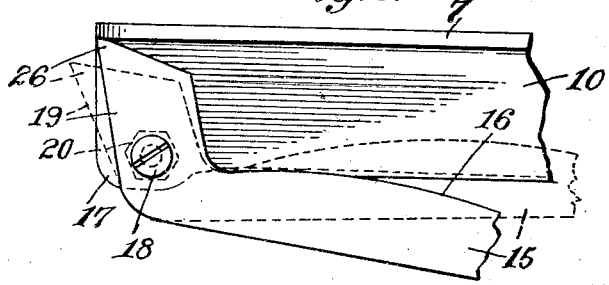
Inventor
L. B. Winton
By his Attorney
John O. Seifert Patented Mar. 15, 1932

1,849,261

UNITED STATES PATENT OFFICE

LEWIS B. WINTON, OF GREENWICH, CONNECTICUT, ASSIGNOR, BY MESNE ASSIGNMENTS, TO AMERICAN SEALCONE CORPORATION, OF NEW YORK, N. Y., A CORPORATION OF NEW YORK

MEANS FOR OPENING CONTAINERS

Application filed April 2, 1930. Serial No. 440,982.

This invention relates to the opening of closed containers of conical formation, the open or filling end of which is closed by collapsing the same by squeezing together opposite wall portions and securing said end in collapsed and closed condition by clamping a V-shaped metallic strip over the same, said opening operation being accomplished by severing the material of the container along a straight line below the metallic securing strip and above the contents of the container to permit the emptying of the contents in any desired volume as the entire width of the closed end of the container is severed.

It is an object of the invention to provide a stationary cutter relative to which the closed receptacle end is adapted to be positioned by one hand and a cutter movable by the other hand toward and away from the stationary cutter to sever the material of the container along a straight line.

It is another object of the invention to provide a cutter having a limited movement away from a stationary cutter to permit the proper positioning of a container between the movable and stationary cutters and the readily severing of the same.

It is a further object of the invention to provide a cutter having a limited severing movement toward a container positioned relative to a stationary cutter to prevent jamming of the operating hand between the support of the stationary cutter and the movable cutter.

It is a still further object of the invention to provide a movable cutter with a cutting edge of arcuate shape along the longitudinal axis to sever the material of the container evenly and cleanly to prevent stripping of the material onto the contents of the container.

The invention is adapted for use in the home where it is desired to have a fixture at a definite place and ready at hand, as on a kitchen cabinet or wall, where the contents, milk in the present instance, is used in variable quantities and is emptied from the container at various times.

In the drawings accompanying and forming a part of this application, Figure 1 is a perspective view of the severing means showing a container positioned to be severed thereby.

Figure 2 is a view looking at the left of Figure 1 with a portion of the container broken away and the severing means secured to a support.

Figure 3 is a fragmentary plan view showing the arrangement and mounting of a movable cutter relative to a stationary cutter.

Figure 4 is a perspective view of a bracket member constituting the stationary cutter.

Figure 5 is a perspective view of the movable cutter with a handle retaining member dis-assembled therefrom; and Figure 6 is a perspective view of the upper portion of a container showing the closed end severed from the body of the container.

In carrying out the invention there is provided a metallic bracket member bent of right angular form in cross section, one angle portion constituting a side wall 7 having spaced perforations 8 for the engagement of securing means, such as screws 9, to mount the severing means upon a suitable support, as shown at S in Figure 2, such as the wall of a kitchen cabinet, with the other angle portion 10 extending at a right angle from the wall 7 and arranged at the longitudinal edge portion with a cutting edge 11 by declining from the upper surface, as clearly shown in dotted lines in Figure 2. The bracket is adapted to support means to co-operate with the cutting edge 11 of the bracket to sever the upper end of a conical container 12 which is closed at said upper end after filling the container to a predetermined level relative to the edge of said open upper end by squeezing together opposite wall portions, as at 13 in Figure 6, and maintained in collapsed and closed condition by clamping and securing a V-shaped metallic strip 14 over the edges of said collapsed end, as shown in Figure 1.

The means for severing the upper end of the container below the sealing strip and above the level of the contents comprises a movable cutter in the form of a blade 15 of flat material having a cutting edge declining in cross-section from the upper surface of the blade at an angle and in the direction of the cutting edge 11, as shown in Figure 2, and preferably of arcuate or convex form, as at 16 in Figure 5. The blade has swinging movement toward and away from and in a plane above the cutting edge 11 by pivotally mounting the same upon an ear portion 17 at one end of the side wall 10 and extending laterally beyond the cutting edge 11, said ear having a perforation to be engaged by a pivot 18 in the form of a headed screw passing through a perforation in an angle portion 19 of the movable cutter extending as a continuation of and obliquely from the one end of the blade, said screw being secured by a nut 20 threaded onto the end of the screw projecting below the under surface of the wall 10 of the bracket with the head abutting the upper surface of the portion 19. The blade is manipulated relative to the cutting edge 11 by a handle or hand grip 21 engaged on a reduced rectangular end portion 22 of the blade opposite to the end arranged with the angle portion 19, said rectangular end having a reduced extremity 23 to extend beyond the outer end of the handle when engaged on the rectangular portion with the inner end of the handle abutting a shoulder 24 formed at the juncture of the rectangular portion and the body of the blade. The handle is retained on the blade by engaging a retaining member, in the present instance a washer 25, on the projecting end 23 and seated in a recess in the handle, as shown in Figure 1, and then upsetting said end over the washer.

To sever the closed end portion of the container from the body thereof, the cutter 15 is actuated in a direction away from the bracket, said actuation being limited by the end of the angle portion 19 of the cutter abutting the bracket wall 7, said end being arranged to extend obliquely to the side edges of said portion in a declivous direction toward the cutting edge 16, as shown at 26 in Figure 3, thereby forming substantially a V-shaped recess between the cutting edges 11 and 16 into which the upper and closed end of the container is inserted, as shown in Figure 1, by one hand and the blade 15 being actuated toward the bracket by the other hand, first wedging the container between the cutting edges and then upon further movement of the cutter 15 shearing the wall of the container. In the severing movement of the cutter 15 the container has a tendency to be distorted about the longitudinal axis of the cutter 15 rendering the severed edges of the container uneven with the possibility of stripping the container material and the dropping thereof into the container. This is overcome by making the cutter edge 16 of arcuate formation with the vertex thereof intermediate the ends of the blade.

To prevent injury to the actuating hand of the operator at the termination of the severing movement of the cutter 15 by jamming the hand between the cutter support and the handle 20 and also prevent the cutting edge of the movable blade engaging the portion 7 of the bracket and a consequent dulling of the same, the movement of the cutter toward the bracket is limited by a stop extending perpendicularly to the upper surface of the bracket wall 10 with an end adjacent the cutting edge 11. In the present instance the stop is constructed in the form of an angle piece 27 fixed to the bracket wall 7 by screws 28 with the other side wall of said piece extending along the end portion of the wall 10 and terminating adjacent the cutting edge 11, as shown in Figures 1 and 4, to engage the portion of the blade adjacent the handle thereby maintaining a space between the handle and support S substantially equal to the width of the wall 10 preventing jamming of the actuating hand. The stop 27 may be formed by bending up at a right angle the end portion of the wall 10.

It will be obvious that various modifications may be made in the construction and arrangement of parts, and that portions of the invention may be used without others without departing from the scope of the invention.

Having thus described my invention, I claim:

1. In means for severing containers at an end closed by squeezing together opposite wall portions, a bracket of angle shape in cross section having one angle portion arranged with perforations for securing means to mount the bracket on a support and the other angle portion arranged with a cutting edge, a cutter blade pivotally mounted at one end adjacent one end of the bracket juxtaposed to the angle portion with the cutting edge to have movement toward and away from said edge and the cutter blade during the movement toward said cutting edge cooperating therewith to sever a closed container end positioned relative to the bracket cutting edge, said pivoted cutter blade being arranged at the mounting end to co-operate with the bracket to limit the movement of the cutter blade away from the bracket, a hand grip mounted on the free end of the pivoted cutter blade, and an abutment extended from the bracket for engagement of the cutter blade to limit the movement thereof toward the bracket.

2. In means for severing containers at an end closed by squeezing together opposite wall portions, a bracket of angle shape in cross section having one angle portion arranged for mounting the bracket on a support and the edge of the other portion arranged as a cutting edge and relative to which the closed container end is adapted to be positioned, and a cutter blade pivotally mounted at one end on the bracket juxtaposed to the angle portion with the cutting edge to have movement toward and away from said edge and having an angle extension at the mounting end thereof to abut the mounting angle portion of the bracket to limit the movement of the blade away from the bracket, a manipulating hand grip mounted on the free end of the cutter blade, and an abutment extended laterally of the angle portion of the bracket with the cutting edge for engagement with and limiting the movement of the blade toward the bracket.

3. Means for severing containers as claimed in claim 2, wherein the end of the angle extension of the cutter blade declines at an angle toward the cutting edge of the cutter blade to permit of movement of the cutter blade toward the bracket cutting edge and limit the movement thereof away from the bracket.

4. In means for severing containers at an end closed by squeezing together opposite wall portions, a bracket of angle shape in cross section having an angle portion arranged with perforations for engagement of securing means to mount the bracket on a support and the longitudinal edge of the other angle portion arranged as a cutting edge relative to which the closed container end is adapted to be positioned, said angle portion having an ear extending from the cutting edge, and a cutter blade pivotally mounted at one end on the bracket ear and adapted to be manipulated toward and away from the bracket cutting edge to sever the closed container end in co-operation therewith, said cutter blade having an angle portion extending from the mounting end adapted to engage the mounting angle portion of the bracket at a predetermined point in the movement of the blade away from the bracket cutting edge to limit said movement of the blade.

5. Means for severing containers as claimed in claim 1, wherein the lateral extending abutment comprises an angle member extending perpendicularly from the bracket angle portion arranged with the cutting edge with an end thereof adjacent the cutting edge to be engaged by and limit the severing movement of the blade.

Signed at the city of New York, in the county of New York, and State of New York, this 19th day of March, A. D. 1930.

LEWIS B. WINTON.